United States Patent
Bywalez et al.

[19]

[11] Patent Number: 5,911,458
[45] Date of Patent: Jun. 15, 1999

[54] PROCESS FOR THE PRODUCTION OF A ROLLING BEARING UNIT COMPRISING A PLURALITY OF INDIVIDUAL COMPONENTS

[75] Inventors: Karl Bywalez, Schweinfurt; Roland Langer, Schwanfeld, both of Germany

[73] Assignee: FAG Automobiltechnik AG, Germany

[21] Appl. No.: 08/831,067

[22] Filed: Apr. 1, 1997

[30] Foreign Application Priority Data

Apr. 4, 1996 [DE] Germany .......................... 196 13 441

[51] Int. Cl.[6] ...................................... B23P 15/00
[52] U.S. Cl. ................... 29/898.062; 29/407.08; 29/898.07; 29/898.09
[58] Field of Search .......................... 29/898.09, 898.07, 29/407.08, 702, 706, 898.062

[56] References Cited

U.S. PATENT DOCUMENTS 5,490,732  2/1996  Hofmann et al. ..................... 384/537
5,533,250  7/1996  Ladouceur ............................ 29/702

Primary Examiner—Carl E. Hall
Attorney, Agent, or Firm—Ostrolenk, Faber, Gerb & Soffen, LLP

[57] ABSTRACT

A process for applying one or more inner races on a shaft or a hub of a rolling bearing unit that allows the individual components to be produced with relatively wide tolerances. It is particularly useful in a wheel bearing. The process includes determining the force displacement characteristic on the bearing elements at stages of applying the one or both bearing inner races to the hub at the time the first applied bearing race contacts a stop or shoulder on the hub and then during the cold forming of a collar on the hub securing the inner races on the hub. The force displacement characteristic is monitored and may be compared with predetermined stored values.

12 Claims, 2 Drawing Sheets

PROCESS FOR THE PRODUCTION OF A ROLLING BEARING UNIT COMPRISING A PLURALITY OF INDIVIDUAL COMPONENTS

BACKGROUND OF THE INVENTION

The invention relates to a process for producing a rolling bearing unit comprising a plurality of individual components and particularly relates to a process for monitoring the force displacement characteristic of steps in assembly of the bearing for achieving desired prestress values for the bearing elements.

DE 43 39 847 C1 discloses a bearing unit in which two rolling bearing inner races to be arranged on a wheel hub are assembled into a unit by means of a cold formed collar.

The extent of the projection and deformation of the initially undeformed collar is important since this determines the bracing force of the inner race of the bearing arrangement. Narrow tolerances and precise dimensions are therefore required. Such wheel bearing arrangements are, as a result, expensive to manufacture.

SUMMARY OF THE INVENTION

It is therefore the object of the invention to provide a process for producing a rolling bearing unit comprised of a plurality of individual components which permits manufacturing the individual components with relatively wide tolerances while achieving precisely defined bracing of the bearing arrangement.

The invention concerns a process for applying one or more inner races on a shaft or a hub of a rolling bearing unit that allows the individual components to be produced with relatively wide tolerances. The invention is particularly useful in fabricating a wheel bearing. The process includes determining the force displacement characteristic on the bearing elements at stages of applying the one or both bearing inner races to the shaft or hub at the time the first applied bearing race contacts a stop or shoulder on the hub and then during the cold forming of a collar on the hub securing the inner races on the hub. The force displacement characteristic is monitored by a force measuring apparatus and may be compared with predetermined stored values stored in the apparatus. The force displacement characteristic is determined and compared with a predetermined value both as the bearing race or races are pushed onto the hub and during usually cold forming of the collar. Deviations from the desired values are used to provide control variables for the force controlled assembly machines. This enables the work process to be reliably monitored and automated. The bearing arrangement can then always be set up with the preselected preload. Deviations from the predetermined force displacement diagram allow errors to be inferred and thus to be easily detected.

Other features and advantages of the present invention will become apparent from the following description of the invention which refers to the accompanying drawings.

DETAILED DESCRIPTION OF EMBODIMENTS OF THE INVENTION

Figure 1:
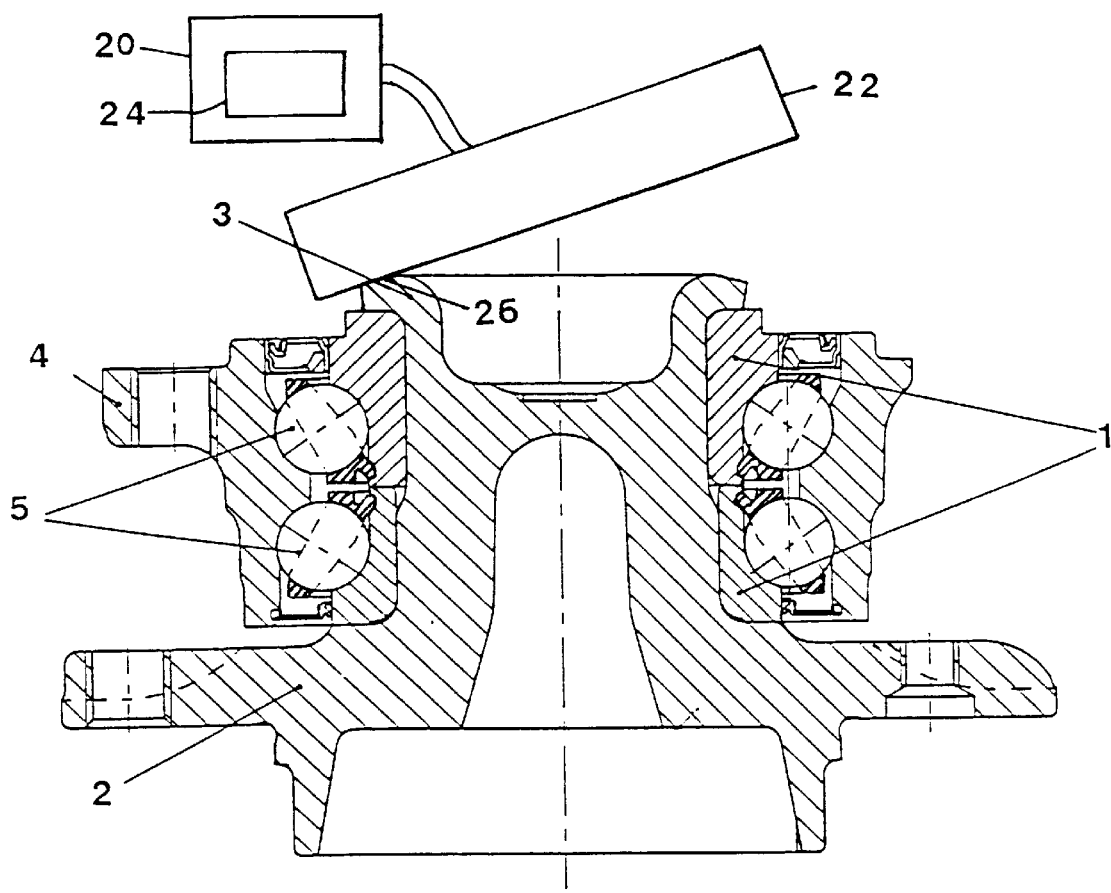
FIG. 1 shows the course of the process of the invention using a wheel bearing arrangement with two inner races as an example.

FIG. 1 shows a wheel bearing assembled according to the process of the invention. Two axially adjacent inner races 1 are pushed onto a wheel hub or shaft 2 and are braced against one another by a cold formed collar 3. The outer race 4 and the rings of balls 5 have a precise and defined prestress without the need to maintain excessively high tolerances. As the inner races 1 are pushed onto the wheel hub and the collar 3 is cold formed on the races, the force displacement characteristic is determined and compared with predetermined values by means of an electronic measuring device 20 shown schematically in FIG. 1. The device 20 receives a signal from a wobble press 22 and a force sensor, such as a piezoelectric device in the press 22, monitors the force applied and sends a signal to the device 20, which performs the comparison and which also displays the results of the monitoring process on the screen 24.

Figure 2:
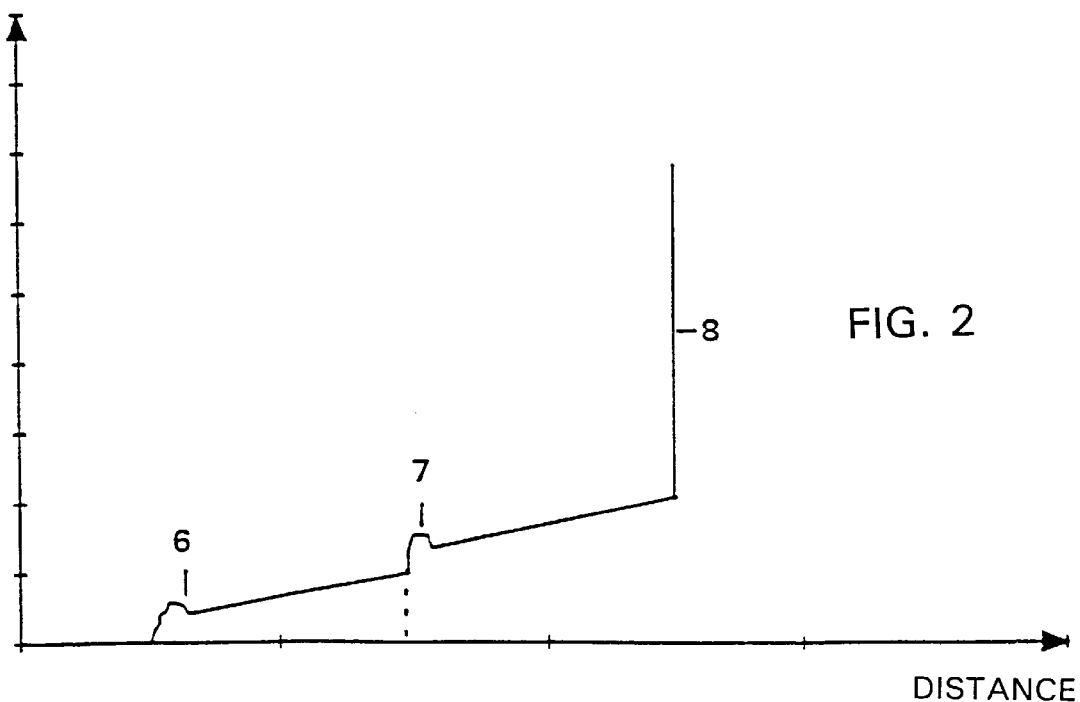
FIG. 2 shows an example of the force displacement characteristic as the inner races are pushed onto the hub.

FIG. 2 shows a typical shape for a force displacement curve which may be displayed on the screen 24. Three regions of the curve are clearly visible, each respectively based on one of the following events: As the first inner race 1 is pushed onto the wheel hub (initial engagement), there is at first a rise in the push on force, followed by a fall, producing a first peak 6. During subsequent sliding on of the first inner race, the assembly force then rises steadily. A similar peak 7 is produced during initial engagement of the second inner race. As the two inner races are subsequently slid along the hub, the assembly force continues to rise steadily again. When the first ring rests against the shoulder of the hub, there is a sharp rise 8 in the force for only a very short residual displacement. Since the curve shape of FIG. 2 is typical, the positions and sizes of the peak can be used to monitor the assembly operation electronically. Each deviation from predetermined values indicates an assembly error, which may have been caused, for example, by a particle of dirt between contacting surfaces or by a ring with too large a bore. The correctness of assembly of the inner race is monitored by means of the steepness of the curve in region 8. Since the inner races are applied with variable force application, the force supplied by the force controlled forming machine 22 can be adjusted for deviations from the predetermined force displacement characteristic.

Figure 3:
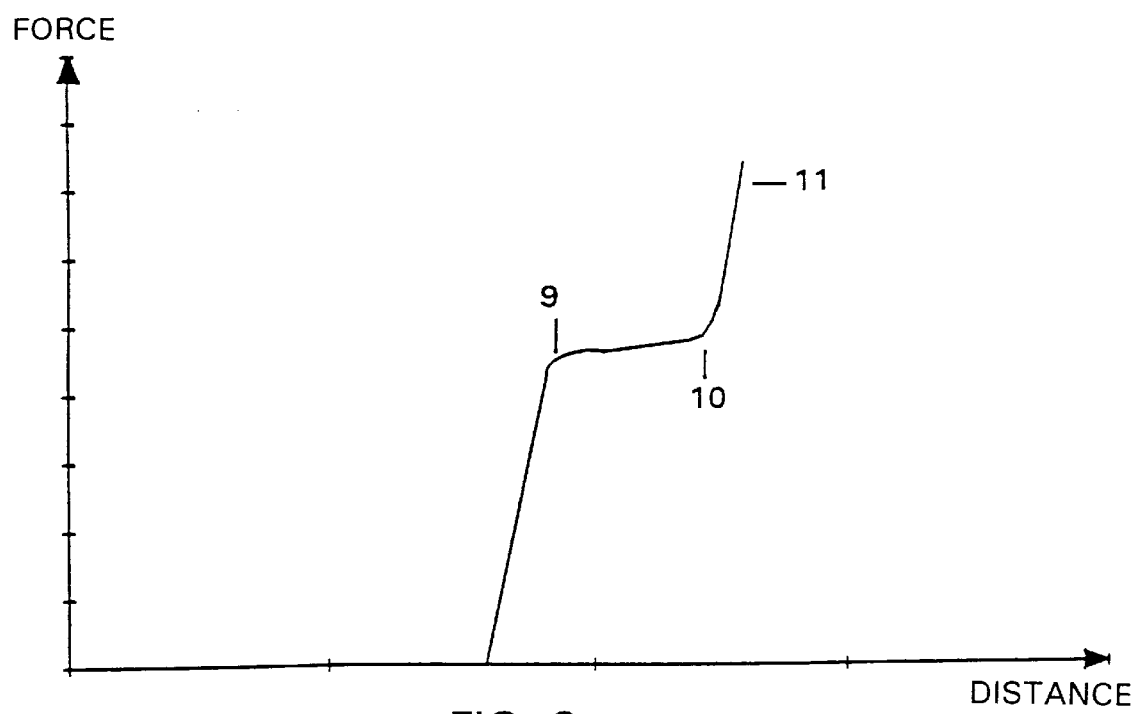
FIG. 3 shows an example of the force displacement characteristic during forming of the collar.

Formation of the collar 3 of the hub after mounting inner rings 1 on the hub is also monitored using the same method. FIG. 3 shows one such force displacement characteristic. After a steady rise in the force displacement curve which is characteristic of the predetermined forming rate and proportional to the required clamping force on the inner race, there is likewise a peak 9, after which the shape of the force displacement curve changes, with the forming force falling, for example. This is the region in which the collar expands radially and flows during forming the rate of forming the collar is dependent upon the materials thereof. As soon as the collar has been deformed enough to rest against the inner race, there is again a sharp change in the force displacement characteristic, as shown by region 10 of the curve. This curve shape too is typical and is monitored electronically using the same apparatus which measures the force displacement characteristic. Deviations are thus reliably detected.

In many cases the force displacement characteristic thus determined can also be used to control the force controlled forming machine. The forming machine may include a wobble press 22, preferably with a hydraulic advance of a well known type. All of the rotary force being applied by the press 22 is concentrated locally at one continuously changing location around the inner ring and around the collar e.g. at 26, as the wobble press rotates. This makes it possible to achieve particularly good results because, by virtue of the rolling riveting action, only relatively small forming forces are required.

The force controlled forming operation enables the clamping force on the inner race to be set precisely and to determine the bearing preload. The required inner race clamping force remains constant by monitoring the end point 11 of the force displacement curve. In practice, it has proven advantageous to maintain the forming force for a certain time after the forming operation has been performed, in order to complete forming the collar 3. The cold hardening thereby achieved increases the ability of the collar 3 to bear loads.

Figure 4:
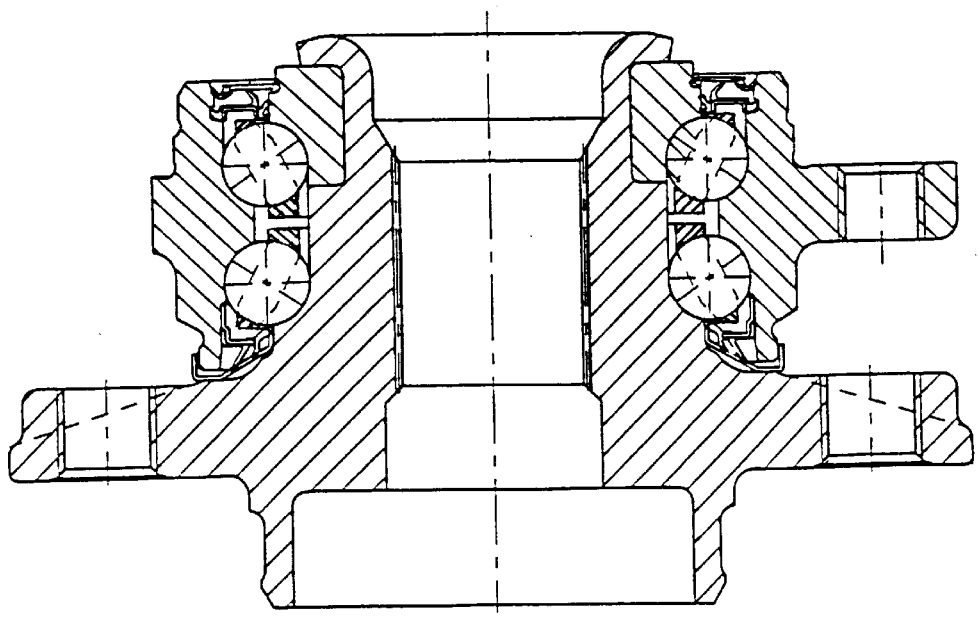
FIG. 4 shows a wheel bearing arrangement for driven wheels with just one inner race as an example for the process of the invention.

FIG. 4 shows a wheel bearing arrangement for driven wheels with just one inner race rather than two. In such a bearing arrangement, the force displacement characteristic obtained is similar to that in FIG. 2 except that because there is only one inner race, the curve does not begin until the rise up to peak 7.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A process for assembling a rolling bearing unit from a plurality of individual components, wherein the rolling bearing includes an inner race for rolling elements, an outer race outside the inner race, rolling elements between the inner and outer races, the process including pressing at least one inner race onto a shaft having a shoulder on the shaft, and pressing the inner race to the shoulder which defines an axial stop for the inner race;

with the at least one inner race on the shaft, cold forming a collar from the shaft at the end of the inner race away from the shoulder;

monitoring force displacement characteristics at the stages that include: while the inner race is pushed on the shaft that defines a hub for the inner race, when the inner race strikes the shoulder defining an axial stop surface of the inner race and during the cold forming of the collar:

comparing the force displacement characteristic at each of the stages with predetermined values; and adjusting variables in the assembly process steps in response to the comparing step.

2. The process of claim 1, further comprising supplying rolling elements on the inner race and supplying an outer ring with an outer race around the rolling elements.

3. The process of claim 1, wherein the inner races are applied to the shaft by a force controlled forming machine with variable force application, the force supplied by the force controlled forming machine being for adjusting for deviations from the predetermined force displacement characteristic at each of the stages.

4. The process of claim 1, wherein the end point of the force displacement characteristic has a value during the stage of the cold forming of the collar, this value is proportional to the required clamping force on the inner race, the method further comprising adjusting the end point of the force displacement characteristic toward the value.

5. The process of claim 1, wherein the end point of the force displacement characteristic has a value during the stage of the cold forming of the collar, this value is proportional to the required clamping force on the inner race, the method further comprising monitoring the value during the cold forming of the collar.

6. The process of claim 1, wherein the rate of forming the collar is dependent on materials and is monitored by the force displacement characteristic.

7. The process of claim 6, wherein the material dependent forming rate of the collar is adjusted dependent upon the monitored force displacement characteristic.

8. The process of claim 1, wherein the force used for cold forming is maintained for a time period following the forming of the collar.

9. The process of claim 1, wherein the force applied for pressing the inner race on the shaft and for cold forming the collar is a rotary force applied locally in a rotary manner around the bearing.

10. The process of claim 1, further comprising electronically monitoring the force displacement characteristic and the deviation therefrom at each of the stages.

11. The process of claim 10, wherein the monitored force displacement characteristics and the evaluation are evaluated electronically and are represented visually on a visual screen.

12. The process of claim 1, wherein there are two of the inner races of the bearing, with a first one of the inner races being applied to the shaft up to the shoulder and the second of the inner races being applied to the shaft up to the first inner race.

\* \* \* \* \*